United States Patent [19]

Larson et al.

[11] Patent Number: 5,055,113

[45] Date of Patent: Oct. 8, 1991

[54] ABRASIVE PRODUCT HAVING BINDER COMPRISING AN AMINOPLAST RESIN

[75] Inventors: Eric G. Larson; Alan R. Kirk, both of St. Paul, Minn.

[73] Assignee: Minnesota Mining and Manufacturing Company, St. Paul, Minn.

[21] Appl. No.: 418,811

[22] Filed: Oct. 13, 1989

Related U.S. Application Data

[63] Continuation-in-part of Ser. No. 276,140, Nov. 23, 1988, Pat. No. 4,903,440.

[51] Int. Cl.$^5$ .............................................. C09K 3/14
[52] U.S. Cl. ........................................ 51/298; 51/295
[58] Field of Search ................ 51/295, 298, 307, 308, 51/309

[56] References Cited

U.S. PATENT DOCUMENTS

| | | | |
|---|---|---|---|
| 2,983,593 | 5/1961 | Duke | 51/298 |
| 3,861,892 | 1/1975 | Wisdom, Jr. et al. | 51/295 |
| 4,035,961 | 7/1977 | Pemrick et al. | 51/295 |
| 4,038,046 | 7/1977 | Supkis | 51/295 |
| 4,047,903 | 9/1977 | Hesse et al. | 51/298 |
| 4,111,667 | 9/1978 | Adams | 51/295 |
| 4,214,877 | 7/1980 | Pemrick | 51/295 |
| 4,315,961 | 2/1982 | Adam et al. | 427/385.5 |
| 4,386,943 | 6/1983 | Gumbel et al. | 51/298 |
| 4,457,766 | 7/1984 | Caul | 51/298 |
| 4,520,167 | 5/1985 | Blank et al. | 525/131 |
| 4,547,204 | 10/1985 | Caul | 51/298 |
| 4,588,419 | 5/1986 | Caul et al. | 51/295 |
| 4,652,274 | 3/1987 | Boettcher et al. | 51/298 |

FOREIGN PATENT DOCUMENTS

| | | |
|---|---|---|
| 0257757 | 3/1988 | European Pat. Off. |
| 57-147542 | 9/1982 | Japan . |
| 1182420 | 2/1970 | United Kingdom . |

*Primary Examiner*—William R. Dixon, Jr.
*Assistant Examiner*—Willie Thompson
*Attorney, Agent, or Firm*—Gary L. Griswold; Walter N. Kirn; David L. Weinstein

[57] ABSTRACT

An abrasive product comprising abrasive grains bonded together or bonded to at least one major surface of a backing sheet, by a binder formed from a precursor comprising an aminoplast resin having on average at least 1.1 pendant $\alpha,\beta$-unsaturated carbonyl groups per molecule. The binder is formed by curing the precursor at the $\alpha,\beta$-unsaturated site of the carbonyl group, by radiation energy or by heat, in the presence of an appropriate initiator system. The aminoplast resin can also contain pendant amino or hydroxy functional groups, which allow polymerization with condensation curable resins, such as phenolic, melamine, urea, urethane, and furfural resins. Polymerization at the unsaturated site of $\alpha,\beta$-unsaturated carbonyl group can be effected either by radiation energy or by heat, and curing at the sites of the amino or hydroxy functional group can be subsequently effected by heat. The binder of this invention can be used to form the make coat, size coat, both coats, or as a backing treatment of a coated abrasive. The binder material can also be used in fibrous non-woven abrasive products. The binder can be used in embodiments where only a single binder coat is employed.

2 Claims, 1 Drawing Sheet

ABRASIVE PRODUCT HAVING BINDER COMPRISING AN AMINOPLAST RESIN

BACKGROUND OF THE INVENTION

This application is a continuation-in-part of application Ser. No. 07/276,140, filed Nov. 23, 1988, U.S. Pat. No. 4,903,440.

1. FIELD OF THE INVENTION

This invention relates to abrasive products having a resinous binder which holds and supports abrasive grains on a backing sheet or in a fibrous sheet.

2. DISCUSSION OF THE ART

Coated abrasives generally comprise a flexible backing upon which a binder holds and supports a coating of abrasive grains. The backing can be selected from paper, cloth, film, vulcanized fiber, etc. or a combination of one or more of these materials, or treated versions thereof. The abrasive grains can be formed of flint, garnet, aluminum oxide, alumina zirconia, ceramic aluminum oxide, diamond, silicon carbide, etc. Binders are commonly selected from phenolic resins, hide glue, urea-formaldehyde resins, urethane resins, epoxy resins and varnish. Phenolic resins include those of the phenol-aldehyde type.

The coated abrasive may employ a "make" coat of resinous binder material in order to secure the ends of the abrasive grains to the backing as the grains are oriented, and a "size" coat of resinous binder material can be applied over the make coat and abrasive grains in order to firmly bond the abrasive grains to the backing. The resin of the size coat can be the same material as the resin of the make coat or of a different material.

In the manufacture of coated abrasives, the make coat and abrasive grains are first applied to the backing, then the size coat is applied, and finally, the construction is fully cured. Generally, thermally curable binders provide coated abrasives having excellent properties, e.g., heat resistance. Thermally curable binders include phenolic resins, urea-formaldehyde resins, urethane resins, melamine resins, epoxy resins, and alkyd resins. In order to obtain the proper coating viscosities, solvent is commonly added to these resins. When polyester or cellulose backings are used, curing temperature is limited to about 130° C. At this temperature, cure times are long. The long cure time along with solvent removal necessitate the use of festoon curing areas. Disadvantages of festoon curing areas include the formation of defects at the suspension rods, inconsistent cure due to temperature variations in the large festoon ovens, sagging of the binder, wrinkling of very flexible webs, and shifting of abrasive grains. Furthermore, festoon curing areas require large amounts of space and enormous amounts of energy.

Radiation curing processes have been used in an attempt to avoid the disadvantages of festoon ovens. For example, Offenlegungsschrift 1,956,810 discloses the uses of radiation for the curing of unsaturated polyester resins, acid hardenable urea resins, and other synthetic resins especially in mixtures with styrene. U.S. Pat. No. 4,047,903 discloses a radiation curable binder comprising a resin prepared by at least partial reaction of (a) epoxy resins having at least 2 epoxy groups, e.g., from diphenylolpropane and epichlorohydrin, with (b) unsaturated monocarboxylic acids, and (c) optionally polycarboxylic acid anhyride. U.S. Pat. No. 4,547,204 discloses the use of radiation curable acrylated epoxy resins in one adhesive layer of the coated abrasive and the use of a heat curable phenolic or acrylic latex resin in another adhesive layer of the coated abrasive.

Although radiation curable resins solve the problems associated with thermally curable resins, with respect to festoon ovens, the radiation curable resins are generally more expensive than the thermally curable resins. In many abrasive products this increase in cost cannot be tolerated and thermally curable resins are still utilized. Also, radiation curable resins generally do not exhibit the heat resistance necessary for severe coated abrasive applications. In an attempt to solve these problems, U.S. Pat. No. 4,588,419 discloses an adhesive for coated abrasives comprising a mixture of: (a) electron beam radiation curable resin system comprising an oligomer selected from the group consisting of: urethane acrylates or epoxy acrylates, filler, and a diluent and (b) a thermally curable resin selected from the group of phenolic resins, melamine resins, amino resins, alkyd resins, and furan resins. However, the radiation curable resin and the thermally curable resin disclosed in this patent do not co-react or copolymerize. It is desired that the radiation curable resin and the thermally curable resin copolymerize in order to form a tight cross-link network, thereby providing improved thermal properties necessary for severe coated abrasive applications.

SUMMARY OF THE INVENTION

This invention provides abrasive products comprising abrasive grains bonded together or bonded to a backing by means of a binder formed from a precursor comprising an aminoplast resin having on average at least 1.1 pendant $\alpha,\beta$-unsaturated carbonyl groups per molecule. The so-called $\alpha,\beta$-unsaturated carbonyl groups include acrylates, methacrylates, acrylamides, and methacrylamides. The aminoplast resins polymerize via free-radical polymerization at the site of $\alpha,\beta$-unsaturation and are curable by either heat or radiation. In addition, the aminoplast resins can also contain pendant amino (—NHR) or hydroxy (—OH) functional groups. Polymerization can occur at the sites of the —NHR and —OH functional groups via a condensation reaction. The R substituent of the —NHR group is typically a hydrogen atom or a hydrocarbon, which may be substituted or unsubstituted, but if substituted, the substituents should be those that do not inhibit or prevent polymerization. Typical examples of the R substituent include alkyl, e.g., methyl, ethyl, aryl, e.g., phenyl, alkoxy, and carbonyl.

In one embodiment of this invention, conventional thermally curable resins, such as phenolic, urea, melamine, and furfural resins can be added to the monomer which forms the precursor of the binder. These resins will copolymerize with each other or with the aminoplast resin at the sites of the —NHR or —OH functional groups.

Preferably, resin systems for preparing the binder for the abrasives of this invention are selected from the groups consisting of:

A. aminoplast resins having on average at least 1.1 pendant $\alpha,\beta$-unsaturated carbonyl groups per molecule, B. aminoplast resins having on average at least 1.1 pendant $\alpha,\beta$-unsaturated carbonyl groups per molecule and at least one pendant —NHR or —OH functional group per molecule, C. condensation curable resins and aminoplast resins having on average at least 1.1 pendant $\alpha,\beta$-unsaturated carbonyl groups per molecule and at least one pendant —NHR or —OH functional group per molecule, D. ethylenically unsaturated compounds and aminoplast resins having on average at least 1.1 pendant $\alpha,\beta$-unsaturated carbonyl groups per molecule, E. ethylenically unsaturated compounds and aminoplast resins having on average at least 1.1 pendant $\alpha,\beta$-unsaturated carbonyl groups per molecule and at least one pendant —NHR or —OH functional group per molecule, and F. ethylenically unsaturated compounds, aminoplast resins having on average at least 1.1 pendant $\alpha,\beta$-unsaturated carbonyl groups per molecule and at least one pendant —NHR or —OH functional group per molecule, and condensation curable resins.

The method of preparing the abrasives of this invention eliminates the problems associated with both radiation curable resins and thermally curable resins. The mixing of radiation curable resins with thermally curable resins results in a reduced cost, as compared with a composition containing radiation curable resins only, and in elimination of the need for festoon ovens. The performance of the coated abrasive of the present invention equals or exceeds that of coated abrasives formed with thermally curable phenolic resins. The coated abrasive of this invention demonstrates improved grinding performance under severe conditions with respect to coated abrasives comprising radiation curable resins heretofore known.

DETAILED DESCRIPTION

Figure 2:
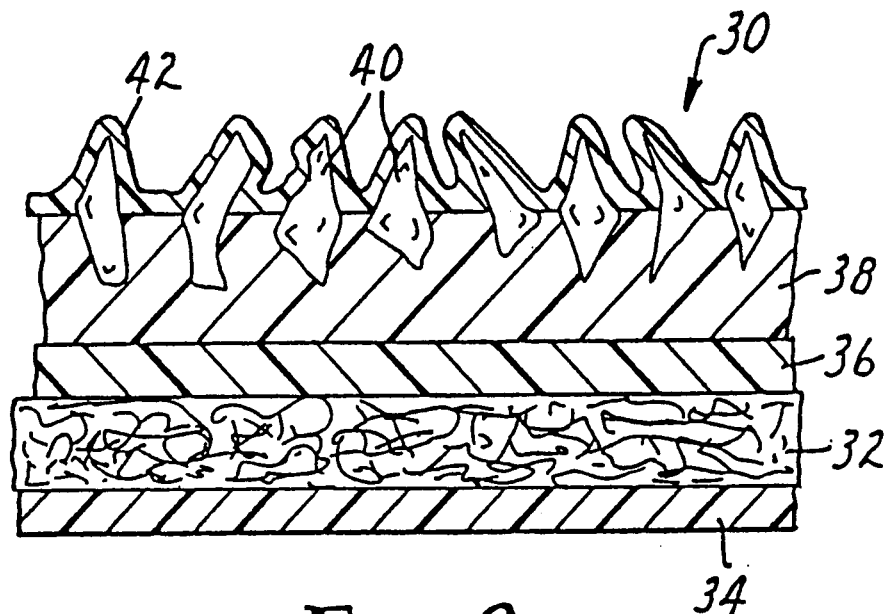
FIG. 2 illustrates in cross-section a coated abrasive on a paper backing material.
Figure 1:
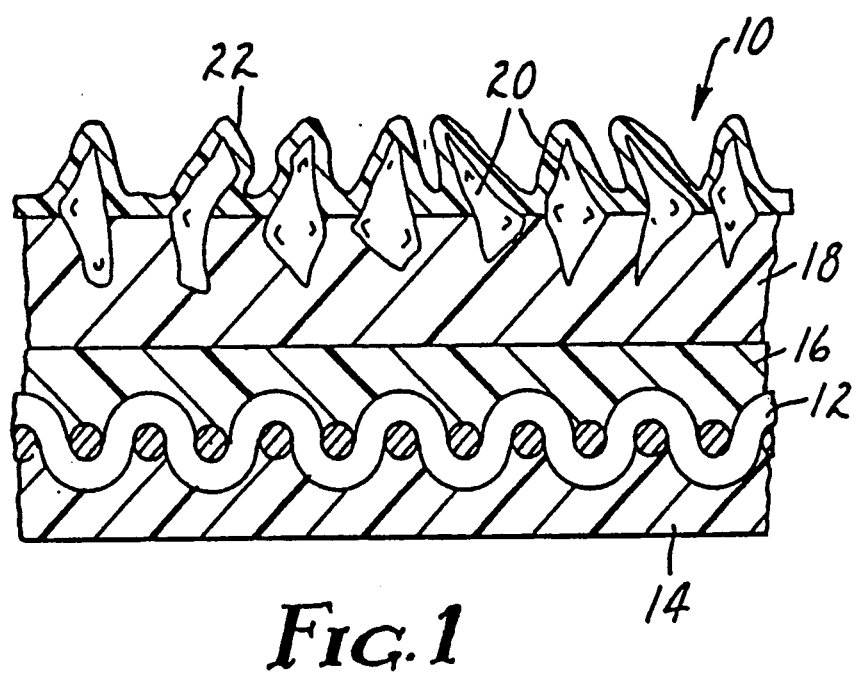
FIG. 1 illustrates in cross-section a coated abrasive on a cloth backing material.

Coated abrasives that may be produced by the resin systems of the invention are illustrated in FIGS. 1 and 2. As illustrated in FIG. 1, the coated abrasive generally indicated as 10 is cloth backed. Cloth 12 has been treated with an optional backsize coat 14 and an optional presize coat 16. Overlaying the presize coat is a make coat 18 in which are embedded abrasive granules 20 such as silicon carbide or aluminum oxide. A size coat 22 has been placed over the make coat 18 and the abrasive granules 20. There is no clear line of demarcation between the backsize coat and the presize coat which meet in the interior of the cloth backing which is saturated as much as possible with the resins of these coats.

In FIG. 2 there is illustrated a coated abrasive generally indicated as 30 which is formed on a paper backing 32. Paper backing is treated with a backsize coat 34 and presize coat 36. The presize coat is overcoated with a make coat 38 in which are embedded abrasive granules 40. The abrasive granules 40 and make coat 38 are overcoated with a size coat 42 which aids in holding the abrasive granules 40 onto the backing during utilization and further may contain cutting aids.

As used herein, the term "binder precursor solution" means a dispersion from which a binder precursor is applied, and not the cured binder. The term "binder precursor" means an uncured composition which, upon curing, becomes a binder. The term "binder" means a cured binder. As used herein, terms "aminoplast resin" and "aminoplast" are interchangeable.

In general, aminoplast resins refer to the class of thermosetting resins obtained by reacting amino compounds with aldehydes to produce compounds having hydroxyalkyl groups. The most common aldehyde is formaldehyde, which reacts with the amino group (—NHR) to produce compounds having hydroxymethyl groups. Other commonly used aldehydes include acetaldehyde, glutaraldehyde, glyoxylic acid, acetals, malondialdehyde, glyoxal, furfural, and acrolein. Compounds having hydroxyalkyl groups will either condense with each other or with compounds having amino groups to produce a cross-linked network. Aminoplasts are thermosetting, and, when cross-linked, produce an insoluble and infusible resinous network. Aminoplasts have high strength, rigidity, dimensional stability, heat resistance, and absence of cold flow. Aminoplasts have on average more than one reactive site per molecule. The reactive site can either be an —NHR or an —OH functional group. The R substituent of the —NHR group is typically a hydrogen atom or a hydrocarbon, which may be substituted or unsubstituted, but if substituted, the substituent or substituents should be those that do not inhibit or prevent polymerization. Typical examples of the R substituent include alkyl, e.g., methyl, ethyl, aryl, e.g., phenyl, alkoxy, and carbonyl. Representative examples of aminoplast resins include urea-formaldehyde, melamine-formaldehyde, guanamine resins such as benzoguanamine-formaldehyde and acetoguanamine-formaldehyde, aniline-formaldehyde, toluenesulfonamide-formaldehyde, acrylamide-formaldehyde, and ethyleneurea-formaldehyde.

To form the aminoplast resins specifically suitable for the present invention, the amino compound is first reacted with the aldehyde so that at least 1.1 of the —NHR groups in the amino compound are reacted with the aldehyde; the resulting product is then reacted with an alcohol that has a double bond to produce an aminoplast resin having on average at least 1.1 pendant $\alpha,\beta$-unsaturated carbonyl groups per molecule.

When an aminoplast is first reacted with an aldehyde, a statistical mixture is obtained. Accordingly, the phrase "on average" is used herein to denote this situation. For example, the ratio between the starting aminoplast and the aldehyde should theoretically result in an aminoplast having 1.5 pendant hydroxyalkyl groups. However, since a statistical mixture is obtained, some aminoplasts may have zero pendant hydroxyalkyl groups, others may have one pendant hydroxyalkyl groups, others may have two pendant hydroxyalkyl groups while still others may have three pendant hydroxyalkyl groups.

In order to form an aminoplast resin with the requisite number of pendant $\alpha,\beta$-unsaturated carbonyl groups per molecule, the starting aminoplast must have on average at least 1.1 activated or reactive —NHR groups per molecule. The starting amino compound can be added to a reaction vessel along with an aldehyde in a molar ratio of 1 mole aminoplast to between 1.1 to n moles aldehyde, where n is the number of reactive hydrogens of the aminoplast. If the starting amino compound is a melamine, the preferred molar ratio is 1 mole melamine to 2 to 3 moles aldehyde. Formaldehyde is the preferred aldehyde and is commercially available, typically as a 37% aqueous solution. This reaction mixture is heated between 70° C. to 80° C. to cause the following reaction, depending upon the starting materials:

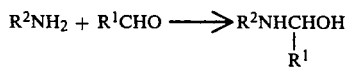 (I)

where $R^1CHO$ represents an aldehyde; $R^2NH_2$ represents an amino compound; $R^1$ represents a member of the group selected from hydrogen, alkyl group, preferably having 1 to 20 carbon atoms, inclusive, alkenyl group, preferably having 1 to 20 carbon atoms, inclusive, and aryl group, preferably having 1 ring; $R^2$ represents any deactivating group which will allow the reaction to occur. As used herein, a "deactivating group" is an electron-withdrawing group, such as carbonyl, sulfonyl, chloro, and aryl. When $R^1$ is an alkyl group, alkenyl group, or aryl group, it can be substituted or unsubstituted. If $R^1$ is substituted, the substituent can be any that does not interfere with Reaction I. Examples of $R^1CHO$ include formaldehyde, propionaldehyde, benzaldehyde. Examples of $R^2$ include a carbonyl group, a triazine ring, a deactivated ring, or $S=O$. The hydrogen atom next to the nitrogen atom is considered to be a reactive hydrogen with respect to further condensation. If there are two $NH_2$ functional groups, the following reactions can occur:

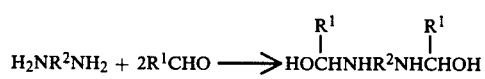 (II)

or

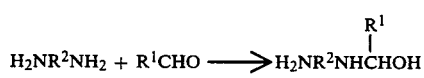 (III)

In the case where the amino compound is melamine and the aldehyde is formaldehyde, the following reaction can occur either under acidic or basic conditions.

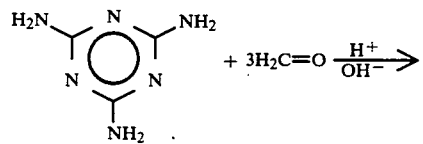 (IV)

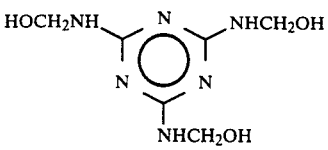

This type of material is commercially available and sold under the trade name of BTLM 405, available from BTL Specialty Resins.

The resulting product is then reacted with an alcohol having a double bond. The alcohol is preferably an $\alpha,\beta$-unsaturated ester, e.g.,

more preferably an hydroxyethylacrylate ester. The two are combined in a reaction vessel along with an acid catalyst. The molar ratio between the aminoplast and the alcohol having a double bond is 1.0 mole aminoplast to between 1.1 to m moles alcohol having a double bond, where m is the number of equivalents of the aldehyde. In the case of melamine, the molar ratio of melamine to formaldehyde can range from 1.1:1 to 6:1, preferably from 1.5:1 to 3:1. For melamine-formaldehyde, the molar ratio of melamine-formaldehyde to the alcohol having a double bond can range from 1.1:1 to 6:1, preferably from 1.5:1 to 3:1. The molar ratio of the aldehyde to the alcohol having a double bond must be equal to or greater than 1:1. Representative examples of acid catalysts include trifluoroacetic acid, p-toluenesulfonic acid, and sulfuric acid. Then, this reaction mixture is gently heated to about 40° C. to bring about the following reaction:

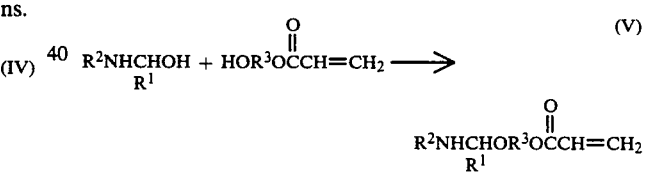 (V)

where $R^1$ and $R^2$ are as defined previously, and $R^3$ represents an aliphatic group, preferably having from 1 to 6 carbon atoms, inclusive;

In the case of melamine-formaldehyde and hydroxyethyl acrylate, the following reaction can occur:

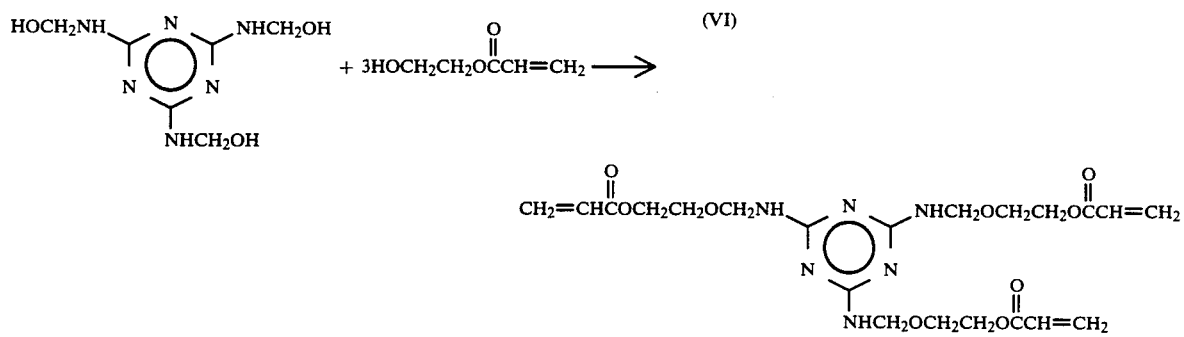 (VI)

or

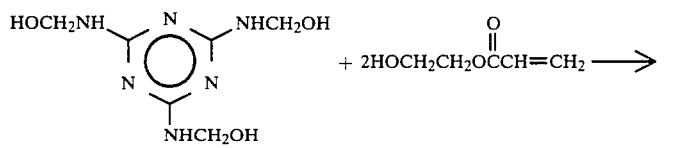

+ 2HOCH₂CH₂OC(=O)CH=CH₂ ⟶ (VII)

The resulting aminoplast, which has on average at least 1.1 pendant α,β-unsaturated carbonyl groups per molecule, can now be used in the binder of the abrasive article of this invention.

If the aminoplast is made according to Reaction V or Reaction VI, polymerization at the site of the pendant α,β-unsaturated carbonyl groups can be effected via a free-radical mechanism. The rate of polymerization can be increased through the use of initiators, and polymerization can be initiated either by heat or radiation.

If the aminoplast is made according to Reaction VII, polymerization can be effected at the site of both the acrylate functional groups and the —OH functional groups. Polymerization at the site of the —NHR and —OH functional groups will occur via a condensation reaction. The aminoplast can copolymerize with other condensation curable resins.

N-Methylolacrylamide and other acrylamide-aldehydes can be dimerized to produce an aminoplast having on average at least 1.1 pendant α,β-unsaturated carbonyl groups per molecule. This reaction will occur in the presence of an acid source, such as p-toluenesulfonic acid by the following reaction:

2CH₂=CHC(O)NHCHR¹OH →(H⁺) (VIII)

H₂O + CH₂=CHC(O)NHCHR¹OCHR¹NHC(O)CH=CH₂

This aminoplast has been found to be an excellent precursor for the binder for abrasive articles of this invention.

Aminoplasts having on average at least 1.1 pendant α,β-unsaturated carbonyl groups per molecule can also be formed by Tscherniac-Einhorn reactions or amidoalkylation of aromatic compounds, such as, for example, phenols, naphthols, cresols, resorcinols, which reactions are illustrated below:

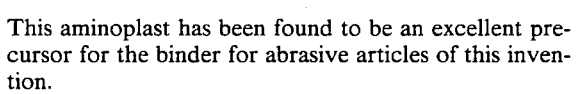

+ 3R¹CHO + 3CH₂=CHC(O)NH₂ →(H⁺) (IX)

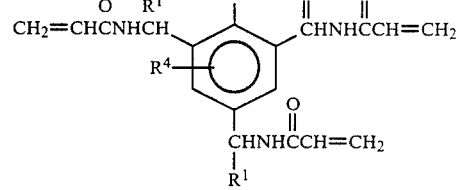

(X)

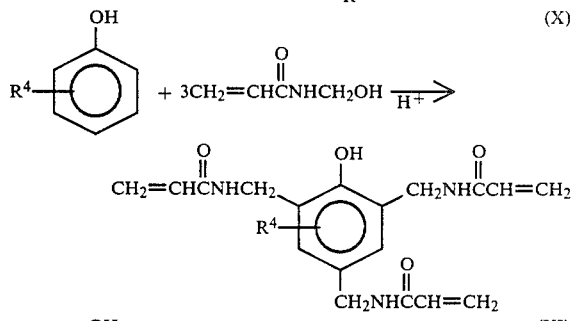

(XI)

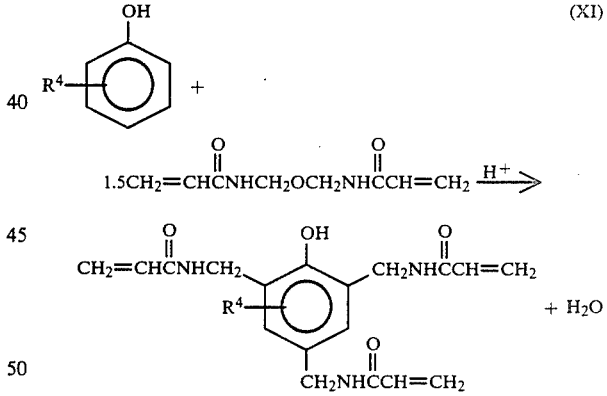

(XII)

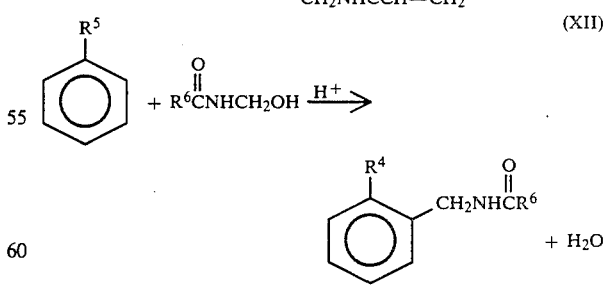

wherein R¹ is as defined above; R⁴ represents any substitutent, or combination of substituents, that does not adversely affect the reaction. Examples of such substituents include hydrogen, alkyl group, preferably having 1 to 20 carbon atoms, inclusive, alkoxy group, preferably having 1 to 20 carbon atoms, includes, —OH group, mercapto group, and other groups that activate the aromatic ring toward electrophilic substitution; $R^5$ can represent —OH, —SH, —NH$_2$, hydrogen, alkylamino group, alkylthio group, alkyl group, or alkoxy group; $R^6$ can represent α,β-unsaturated alkenyl group. The alkylamino, alkylthio, alkyl, alkoxy, and alkenyl groups of $R^5$ and $R^6$ preferably have 1 to 20 carbon atoms, inclusive.

Examples of the type of reaction encompassed by Reaction XII can be found in the following references: Zaugg, H. E.; W. B. Martin, "Alpha-Amidoalkylations at Carbon", *Organic Reactions,* Vol. 14, 1965 pages 52 to 77; and Hellmann, H., "Amidomethylation", *Newer Methods of Preparative Organic Chemistry,* Vol. II, Academic Press (New York and London; 1963), pp. 277–302, both of which are incorporated herein by reference.

Another aminoplast useful in this invention is glycoluril. Glycoluril can be reacted with an aldehyde such as formaldehyde to produce tetramethylol glycoluril. This reaction is set forth below as Reaction XIII.

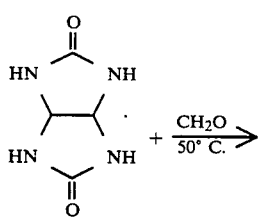

(XIII)

The tetramethylol glycoluril is then reacted with an alcohol having a double bond to produce the aminoplast having on average at least 1.1 pendant α,β-unsaturated carbonyl groups. For example, tetramethylol glycoluril can be reacted with hydroxy ethyl acrylate according to Reaction XIV.

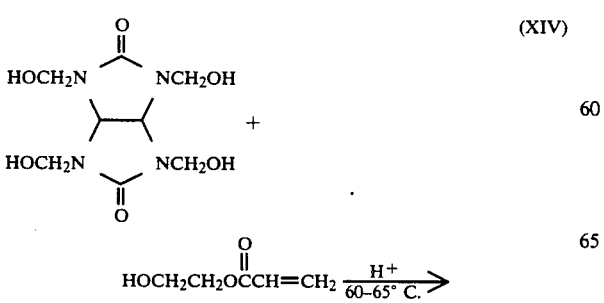

(XIV)

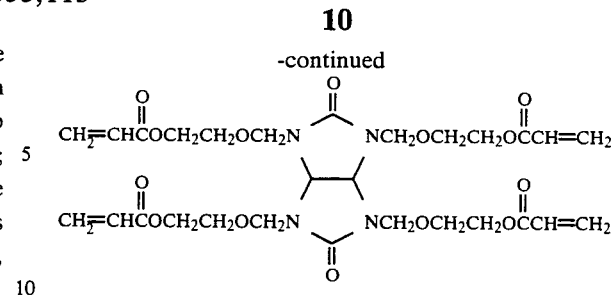

In addition, tetramethylol glycoluril can be reacted with acrylamide according to Reaction XV.

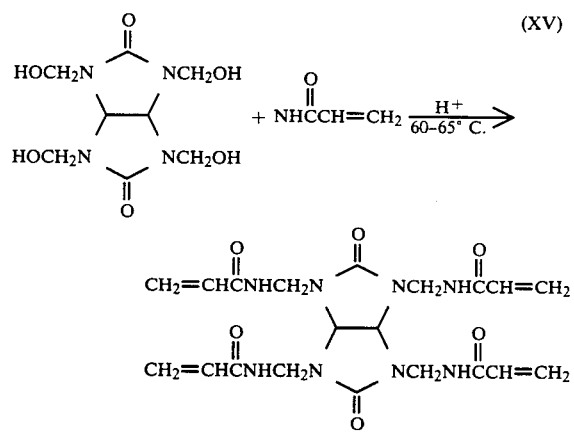

(XV)

In a preferred embodiment, the tetramethylol glycoluril can be reacted with a mixture of acrylamide and hydroxy ethyl acrylate, which results in a statistical reaction product. This reaction is set forth below as Reaction XVI.

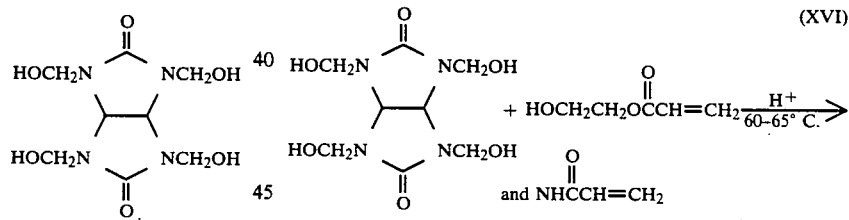

(XVI)

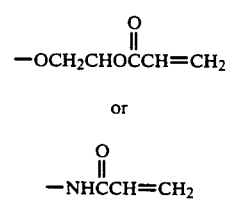

where $R^7$ can be $$-OCH_2CHOCCH=CH_2$$
(with =O)

or $$-NHCCH=CH_2$$
(with =O)

It has been found quite unexpectedly that when the product of Reaction XVI is mixed with other aminoplasts having on average at least 1.1 pendant α,β- unsaturated carbonyl groups and a resole phenolic resin, the rate of cure of the α,β-unsaturated carbonyl groups is significantly increased.

The particular aminoplast is selected on the basis of the type of abrasive product wherein it ultimately will be used. If the product is a fine grade coated abrasive where flexibility and conformability are important properties, the aminoplast preferably is derived from urea. If the product is a coarse grade coated abrasive where hardness and heat resistance are important properties, the aminoplast preferably is derived from a melamine or an acrylamide compound.

While aminoplast resins are known in the art as suitable binders for abrasive articles, as demonstrated in U.S. Pat. Nos. 2,983,593; 3,861,892; 4,035,961; 4,111,667; 4,214,877 and 4,386,943, none of the above references disclose an aminoplast resin having on average at least 1.1 pendant α,β-unsaturated carbonyl groups.

The aminoplast on average must have at least 1.1 pendant α,β-unsaturated carbonyl groups per molecule. This number of groups is necessary to cause cross-linking during free-radical polymerization. If the aminoplast has on average only one pendant α,β-unsaturated carbonyl group per molecule, a linear polymer would be formed upon free-radical polymerization, and linear polymers do not have sufficient strength and hardness to be used as a binder for abrasive articles.

Preferably, the aminoplast should have between 2 and 3 pendant α,β-unsaturated carbonyl groups per aminoplast molecule. It has been found that this range generally provides the best binder for coated abrasives with respect to performance. Preferably, the aminoplast has not more than six pendant α,β-unsaturated carbonyl groups per molecule. If there are more than six such groups, the resulting aminoplast may become too viscous for preparing coated abrasives.

If condensation curable resins are employed in the binder precursors of this invention, they are preferably selected from the group consisting of phenolic, urea-formaldehyde, and melamine-formaldehyde resins. Phenolic resins are preferred because of their thermal properties, availability, low cost, and ease of handling. There are two types of phenolic resins: resole and novolac. Resole phenolics resins can be catalyzed by alkaline catalysts, and the molar ratio of formaldehyde to phenol is greater than or equal to one, typically between 1.0 to 3.0. Alkaline catalysts suitable for resole phenolic resins include sodium hydroxide, barium hydroxide, potassium hydroxide, calcium hydroxide, organic amines, and sodium carbonate. Resole phenolic resins are thermosetting resins, and in the cured form, exhibit excellent toughness, dimensional stability, strength, hardness, and heat resistance.

The above mentioned properties make a resole phenolic resin ideal as a binder for abrasive grains. However, when coated abrasive products are used under wet conditions, the resole phenolic resin softens due to its moisture sensitivity. As a consequence, the performance of the coated abrasive is reduced. However, the present invention overcomes this problem by combining the resole phenolic resin with an aminoplast having at least 1.1 pendant α,β-unsaturated carbonyl groups per molecule. An abrasive product utilizing the resin system described herein has improved water resistance as compared with an abrasive product having a binder of 100% phenolic resin, and as a consequence, exhibits improved grinding performance under wet conditions.

Both the resole and novolac phenolic resins are curable by heat. Novolac phenolic resins require a source of formaldehyde to effect cure. Temperature and pH significantly affect the mechanism of polymerization and the final properties of the cured resin. Examples of commercially available phenolics resins include: "Varcum" from BTL Specialty Resins Corp, "Aerofene" from Ashland Chemical Co., and "Bakelite" from Union Carbide.

Conventional aminoplasts can be added to the binder precursors of this invention and copolymerized at the site of the —OH or the —NHR groups of aminoplasts having α,β-unsaturated carbonyl groups.

1,2-Epoxide group-containing compounds that can be used in the binder precursors of this invention have an oxirane ring, i.e.,

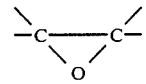

Such materials, broadly called epoxides, include monomeric epoxide compounds and polymeric epoxide compounds, and may vary greatly in the nature of their backbones and substituent groups. For example, the backbone may be of any type and substituent groups thereon can be any group free of an active hydrogen atom, which is reactive with an oxirane ring at room temperature. Representative examples of substituent groups include halogens, ester groups, ether groups, sulfonate groups, siloxane groups, nitro groups, and phosphate groups. The molecular weight of the epoxides can range from about 60 to about 4000, and preferably range from about 100 to about 600. Mixtures of various epoxides can be used in the binders of this invention. These compounds are polymerized by ring opening. The epoxy resins and the aminoplast can copolymerize at the —OH site of the aminoplast. This reaction is not a condensation reaction but is a ring-opening reaction initiated by an acidic or basic catalyst.

Ethylenically unsaturated compounds can also be added to the binder precursors of this invention to modify the final properties where so desired. These compounds can copolymerize with the pendant α,β-unsaturated carbonyl groups of the aminoplast.

Ethylenically unsaturated compounds suitable for this invention include monomeric or polymeric compounds that contain atoms of carbon, hydrogen, and oxygen, and optionally, nitrogen and the halogens. Oxygen and nitrogen atoms are generally present in ether, ester, urethane, amide, and urea groups. The compounds preferably have a molecular weight of less than about 4000. Preferred compounds are esters of aliphatic monohydroxy and polyhydroxy group containing compounds and unsaturated carboxylic acids, such as acrylic acid, methacrylic acid, itaconic acid, crotonic acid, isocrotonic acid, maleic acid, and the like. Representative examples of preferred ethylenically unsaturated compounds include methyl methacrylate, ethyl methacrylate, styrene, divinylbenzene, vinyl toluene, ethylene glycol diacrylate and methacrylate, hexanediol diacrylate, triethylene glycol diacrylate and methacrylate, trimethylolpropane triacrylate, glycerol triacrylate, pentaerythritol triacrylate and methacrylate, pentaerythritol tetraacrylate and methacrylate, dipentaerythritol pentaacrylate, sorbitol triacrylate, sorbitol hexaacrylate, bisphenol A diacrylate, and ethoxylated bisphenol A diacrylate. Other ethylenically unsaturated compounds include ethylene glycol diitaconate, 1,4-butanediol diitaconate, propylene glycol dicrotonate, dimethyl maleate, and the like. Other ethylenically unsaturated compounds include monoallyl, polyallyl, and polymethallyl esters and amides of carboxylic acids, such as diallyl phthalate, diallyl adipate, and N,N-diallyladipamide. Still other nitrogen-containing compounds include tris(2-acryloyl-oxyethyl)isocyanurate, 1,3,5-tri(2-methacryloxyethyl)-s-triazine, acrylamide, ethacrylamide, N-methylacrylamide, N,N-dimethylacrylamide, N-vinylpyrrolidone, and N-vinylpiperidone. It is preferred that the ethylenically unsaturated compounds be acrylic compounds because of their ready availability and accelerated rate of cure.

An aminoplast having on average at least 1.1 pendant $\alpha,\beta$-unsaturated carbonyl groups per molecule can be used alone for preparing the binder precursors for abrasive products of this invention. It is preferred that it be mixed with another condensation curable resin, more preferably a resole phenolic resin. The ratio between the aminoplast having on average at least 1.1 pendant $\alpha,\beta$-unsaturated carbonyl groups per molecule to the condensation curable resin can range from about 90 parts by weight to about 10 parts by weight to from about 10 parts by weight to about 90 parts by weight, preferably from about 50 parts by weight to about 50 parts by weight to from about 25 parts by weight to about 75 parts by weight.

The aminoplasts suitable for use in this invention are not considered to be oligomers. Oligomers, as defined in R. B. Seymour & C. E. Carraher, Jr., *Polymer Chemistry*, 2nd Ed., are very low molecular weight polymers in which the number of repeating units (n) equals 2 to 10. Oligomers are generally much more viscous than aminoplasts having at least 1.1 pendant $\alpha,\beta$-unsaturated carbonyl groups per molecule. The increased viscosity generally makes the oligomeric resins more difficult to apply in the manufacture of coated abrasive products or non-woven three dimensional abrasive products. To reduce the viscosity, solvent is added, which has the disadvantages of being hazardous to health and of requiring removal.

The composition for preparing the binder of the present invention can contain fillers, fibers, lubricants, grinding aids, wetting agents, and minor amounts of other additives such as surfactants, pigments, dyes, coupling agents, plasticizers, and suspending agents. The amounts of these materials are selected to give the properties desired.

Fillers can be selected from any filler material that does not adversely affect the characteristics of the binder. Preferred fillers include calcium carbonate, calcium oxide, calcium metasilicate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in amounts up to about 250 parts by weight, preferably from about 30 to about 150 parts by weight, per 100 parts by weight of composition for preparing the binder while retaining good flexibility and toughness of the cured binder.

The aminoplast can be cured by heat or radiation energy. If the aminoplast is cured by heat, the temperature of the oven should be set to at least about 100° C. and held at this temperature for at least about 4 hours. Curing can be effected in shorter times at higher temperatures. In the case of coated abrasives, the curing temperature is limited to the temperature that synthetic backings or paper backings used in coated abrasive products can withstand. If the aminoplast is cured by radiation, the amount of radiation used depends upon the degree of cure desired of the monomers used to prepare the binder. Examples of radiation energy sources include ionizing radiation, ultraviolet radiation, and visible light radiation. Ionizing radiation, e.g., electron beam radiation, preferably has an energy level of 0.1 to 10 Mrad, more preferably 1 to 10 Mrad. Ultraviolet radiation is non-particulate radiation having a wavelength within the range of 200 to 700 nanometers, more preferably between 250 to 400 nanometers. Visible light radiation is non-particulate radiation having a wavelength within the range of 400 to 800 nanometers, more preferably between 400 to 550 nanometers. The rate of curing with a given level of radiation varies according to the binder thickness as well as the density and nature of the composition.

If the aminoplast having on average at least 1.1 pendant $\alpha,\beta$-unsaturated carbonyl groups per molecule is cured by heat, a thermal initiator can optionally be added to increase the cure speed. Examples of such thermal initiators include peroxides, e.g., benzoyl peroxide, azo compounds, benzophenones, and quinones.

If the composition for preparing the binder is cured by ultraviolet radiation, a photoinitiator is required to initiate the free-radical polymerization. Examples of such photoinitiators are organic peroxides, azo compounds, quinones, benzophenones, nitroso compounds, acyl halides, hydrazones, mercapto compounds, pyrylium compounds, triacrylimidazoles, bisimidazoles, chloroalkyltriazines, benzoin ethers, benzil ketals, thioxanthones, and acetophenone derivatives. Additional references to free-radical photoinitiator systems for ethylenically-unsaturated compounds are described in U.S. Pat. Nos. 3,887,450, 3,895,949, and 3,775,113. Another good reference to free-radical photoinitiator systems is J. Kosar, *Light-Sensitive Systems*, J. Wiley and Sons, Inc. (1965), especially Chapter 5.

If the composition for preparing the binder is cured by visible light radiation, a photoinitiator is required to initiate the free-radical polymerization. Examples of preferred photoinitiators can be found in the U.S. Pat. No. 4,735,632.

The backing can be formed, for example, of paper, cloth, vulcanized fiber, polymeric film, or any other backing material known for use in coated abrasives or treated versions thereof. The abrasive grains can be of any conventional grade utilized in the formation of coated abrasives and can be formed of, for example, flint, garnet, aluminum oxide, ceramic aluminum oxide, alumina zirconia, diamond, silicon carbide, and multigrain granules, etc., or mixtures thereof. The frequency concentration of the abrasive grains on the backing is also conventional. The abrasive grains can be oriented or can be applied to the backing without orientation, depending upon the requirements of the particular coated abrasive product. The coated abrasive product of this invention can also include such modifications as are known in this art. For example, a back coating such as pressure-sensitive adhesive can be applied to the non-abrasive side of the backing and various super sizes, such as zinc stearate, can be applied to the abrasive surface to prevent abrasive loading; alternatively, the super size can contain a grinding aid to enhance the abrading characteristics of the coated abrasive.

The advantage of the coated abrasive of this invention over those of the prior art is the reduction in cost of the relatively expensive aminoplast resin by mixing it with less expensive thermally curable resins, and elimination of festoon ovens. The coated abrasive of this invention has improved abrading performance under severe grinding conditions, especially wet conditions, compared with coated abrasives containing radiation curable compositions for preparing binders heretofore known.

In the manufacture of a coated abrasive product, the binder of this invention can be used as a treatment coat for the backing, e.g., cloth, paper, or plastic sheeting, to saturate or provide a back coat (backsize coat) or front coat (presize coat) thereto, as a make coat to which abrasive grains are initially anchored, as a size coat for tenaciously holding abrasive grains to the backing, or for any combination of the aforementioned coats. In addition, the binder of this invention can be used in coated abrasive embodiments where only a single-coat binder is employed, i.e., where a single-coat takes the place of a make coat/size coat combination. The binder f the present invention can be applied to the backing in one or more treatment steps to form a treatment coat. The treatment coat can be cured by a source of radiation, and can optionally be further cured thermally in a drum form; there is no need to festoon cure the backing in order to set the treatment coat or coats. It is preferable to cure the treatment coat or coats via the radiation source only. After the backing has been properly treated with a treatment coat, the make coat can be applied. After the make coat is applied, the abrasive grains are applied over the make coat. Next, the make coat, now bearing abrasive grains, is exposed to a radiation source, and, optionally, to heat by means of a drum cure, which generally solidifies or sets the binder sufficiently to hold the abrasive grains to the backing. It is preferable to use only the radiation source to set the make coat. Then the size coat is applied, and the size coat/abrasive grain/make coat combination is exposed to a radiation source and to a heat source, preferably via a drum cure. This process will substantially cure or set the make and size coat used in the coated abrasive constructions.

The binder of the present invention only needs to be in at least one of the binder layers, i.e., treatment coat, make coat, size coat, comprising the coated abrasive product. It does not need to be in every binder layer; the other binder layers can utilize various other resinous systems known in the art. If the binder of the present invention is in more than one layer, the radiation source does not need to be the same for curing each layer of the coated abrasive.

It is also contemplated that the binder of this invention can be employed as a binder for non-woven abrasive products. Non-woven abrasive products typically include an open, porous, lofty, polymeric filamentous structure having abrasive grains distributed throughout the structure and bonded therein by an adhesive binder or resinous binder. Methods of making such non-woven abrasive products are well known in the art.

The binder of this invention can also be used for bonded abrasive products. Bonded abrasive products typically consist of a shaped mass of abrasive grains held together by an organic or ceramic binder material. The shaped mass is preferably in the form of a grinding wheel.

The following non-limiting examples will further illustrate the present INVENTION. All coating weights are specified in grams/square meter ($g/m^2$). All resin formulation ratios and percentages are based upon weight. The stock removal of the coated abrasive products tested below represent an average of at least two belts. The experimental error of the grinding tests was ±8%.

The following list describes the various components that were used to fabricate coated abrasive products of this invention.

YW1: Woven Y Weight Polyester/Nylon Backing. The coated abrasive backing used was a Y weight woven polyester/nylon cloth with a four over one weave. The backing was saturated with a latex-/phenolic resin and then placed in an oven to partially cure the resin. Next a latex/phenolic resin and calcium carbonate solution were applied to the backside of the backing and then heated to partially cure the resin. Finally, a latex/phenolic resin was applied to the front side of the backing and heated to partially cure the resin. The backing was completely treated and was ready to receive the make coat.

YW2: Woven Y Weight Polyester Backing. The coated abrasive backing used was a Y weight woven polyester backing with a four over one weave. The treatments were very similar to the YW1 backing described previously. After the backing was completely treated, it was ready to receive the make coat.

XW1: Woven X Weight Cotton Backing. The coated abrasive backing used was a X weight woven cotton backing with a four over one weave. The backing had a saturant treatment and a backsize treatment.

TP1: Test Procedure One. Endless abrasive belts (7.6 cm × 335 cm) were tested on a constant load surface grinder by abrading a 1.9 cm diameter face of a 1095 tool steel rod with 10 successive 10 second grinding passes, weighing and cooling the rod after each pass, employing 68 lb pressure and 2250 meters/minute belt speed. The experimental error on this test was ±10%.

TP2: Test Procedure Two. Endless abrasive belts (7.6 cm × 335 cm) were tested on a constant rate surface grinder by abrading a 1.9 cm diameter face of a 1095 tool steel rod at 5 seconds/rod until the coated abrasive shelled, i.e., a substantial amount of the abrasive grit came off of the backing. The experimental error on this test was ±10%.

TP3: Test Procedure Three. Endless abrasive belts (7.6 cm × 335 cm) were tested on a constant load surface grinder. A pre-weighed, 4150 mild steel workpiece approximately 2.5 cm × 5 cm × 18 cm, mounted in a holder, was positioned vertically, with the 2.5 cm × 18 cm face confronting an approximately 36-cm diameter 85 Shore A durometer serrated rubber contact wheel with one on one lands over which was entrained the coated abrasive belt. The workpiece was then reciprocated vertically through a 18-cm path at the rate of 20 cycles per minute, while a spring-loaded plunger urged the workpiece against the belt with a load of 13.6 kg as the belt was driven at about 2050 meters per minute. After one minute elapsed grinding time, the workpiece holder assembly was removed and reweighed, the amount of stock removed calculated by subtracting the weight after abrasion from the original weight. Then a new, pre-weighed workpiece and holder were mounted on the equipment. The experimental error on this test was ±10%.

TP4: Test Procedure Four. The coated abrasive material was attached to the periphery of a 36 cm metal wheel. The effective cutting area of the abrasive segment was 2.54 cm by 109 cm. The workpiece abraded by these segments was 1018 steel, 1.27 cm width by 36 cm length by 7.6 cm height. Abrading was conducted along the 1.27 cm by 36 cm face. The workpiece was mounted on a reciprocating table. The metal wheel speed was 1500 rpm or 1674 surface meters per minute. The table speed, at which the workpiece traversed, was 20 meters/minute. The downfeed increment of the wheel was 0.0040 cm/pass of the workpiece. The process used was a conventional surface grinding wherein the workpiece was reciprocated beneath the rotating contact wheel with incremental downfeeding between each pass. The grinding was carried out under a water flood.

TP5: Test Procedure Five. TP5 is the same as TP4 except that the testing is done dry, without a water flood and the downfeed increment of the wheel was 0.0056 cm/pass.

TP6: Test Procedure Six. Cured fiber discs having a diameter of 17.8 cm, with a 2.2 cm diameter center hole and thickness of 0.76 mm were installed on a slide action testing machine. The cured discs were first conventionally flexed to controllably break the hard bonding resins, mounted on a beveled aluminum back-up pad, and used to grind the face of a 2.5 cm by 18 cm 1018 mild steel workpiece. The disc was driven at 5,500 rpm while the portion of the disc overlaying the beveled edge of the back-up pad contacted the workpiece at 5.91 kg pressure, generating a disc wear path of about 140 cm². Each disc was used to grind a separate workpiece for one minute each, for a total time of 12 minutes each, or for sufficient one minute time segments until no more than 5 grams of metal were removed in any one minute grinding cut.

TP7: Test Procedure Seven. A cured fiber disc having a diameter of 17.8 cm, with a 2.2 cm diameter center hole and a thickness of 0.76 mm was attached to an aluminum support pad and installed on an edge shelling test apparatus. The edge test involved placing a workpiece in proximity to the outer periphery of the disc at the prescribed angle at the prescribed load for the prescribed time. The workpiece was a 1018 carbon steel disc having a diameter of approximately 25.4 cm and a thickness of 0.18 cm. The edge shelling was conducted at an angle of 18° under a constant load (2.9 kg). The coated abrasive disc traversed at 3500 rpm. The test endpoint was 8 minutes or when the disc began to lose a substantial amount of abrasive grain, i.e., when shelling occurred. The coated abrasive disc and the carbon steel disc were weighed before and after the testing. The weight loss associated with the coated abrasive disc corresponded to the amount of shelling, i.e., the loss of abrasive grain. The weight loss associated with the carbon steel disc corresponded to the amount that the coated abrasive disc cut, i.e., the efficiency of the coated abrasive disc.

In the subsequent examples, the following abbreviations are used:

| | |
|---|---|
| TMPTA | Trimethylol propane triacrylate |
| TATHEIC | Triacrylate of tris(hydroxyethyl) isocyanurate |
| NVP | N-vinyl-2-pyrrolidone |
| TEGDMA | Triethyleneglycol dimethacrylate |
| PH1 | 2,2-dimethoxy-1,2-diphenyl-1-ethanone |
| GUAM Wollastokup ® filler | Reaction product of reaction (XVI) an amino silane treated calcium metasilicate filler available from NYCO Company |

PREPARATION 1

This preparation demonstrates a method for preparing an aminoplast having on average at least 1.1 pendant $\alpha,\beta$-unsaturated carbonyl groups per molecule. The aminoplast is a melamine-formaldehyde resin.

In a glass vessel were combined 1000 g of spray dried methylolated melamine (BTLM 405, available from BTL Specialty Resins) and 1290 g of hydroxyethyl acrylate (Dow Chemical). The suspension was stirred and 4.4 g of trifluoroacetic acid was added. After stirring for 15 hours, the suspension clarified, becoming a colorless liquid resin (93% solids in water liberated from the etherification reaction). The melamine acrylate was now ready to be used in an abrasive article and was designated MA throughout the examples.

COMPARATIVE EXAMPLE A, EXAMPLES 1 AND 2

These examples compare the performance of a coated abrasive utilizing the aminoplast of preparation 1 (MA) in the binder, with a conventional resole phenolic resin binder.

COMPARATIVE EXAMPLE A

Comparative Example A, the control example, utilized a resole phenolic resin in the make and size coats. The backing was YW2. The make coat binder precursor consisted of 48% of resole phenolic resin, 52% Wollastokup ® filler. A solvent (90% water and 10% ethyl cellosolve, i.e., $C_2H_5O[CH_2]_2OH$) was added to the make coat binder precursor to form a 84% solids make coat binder precursor solution. The 90% water/10% ethyl cellosolve solvent was used in all the remaining examples, unless otherwise specified. The make coat binder precursor solution was applied to the backing at an average wet weight of 240 g/m². Immediately thereafter, grade 50 alumina zirconia abrasive grains, were applied over the uncured make coat binder precursor layer at an average weight of 610 g/m². The backing-/uncured make coat precursor/abrasive grain composite was precured for 90 minutes at 88° C. in a festoon oven. Next, a size coat binder precursor solution was applied at an average wet weight of 285 g/m². The size coat binder precursor solution was identical to the make coat binder precursor solution except the percent solids was 78%. After the size coat binder precursor solution was applied, the coated abrasive material was precured for 90 minutes at 88° C. in a festoon oven and final cured for 10 hours at 100° C. The coated abrasive was flexed and tested under test procedure labeled TP4. The test results are set forth in Table I.

EXAMPLE 1

The coated abrasive of Example 1 was prepared and tested in the same manner as the coated abrasive of Comparative Example A, except that a different make coat binder was utilized. The make coat binder precursor of this example comprised 20% MA, 30% a resole phenolic resin, 0.37% PH1, and 50% Wollastokup ® filler. The precursor was diluted with the solvent described in Comparative Example A to form an 88% solids make coat binder precursor solution. The make coat binder precursor solution was applied to a YW2 backing at a weight of 240 g/m². Then, grade 50 alumina zirconia abrasive grains were applied over the uncured make coat binder precursor layer at a weight of 612 g/m². The resulting composite was then exposed to two ultraviolet lamps, each operating at 120 watts/cm. The ultraviolet light initiated free-radical polymerization at the site of the $\alpha,\beta$-unsaturated carbonyl group, but did not initiate condensation reaction of the melamine acrylate. This condensation reaction would be initiated when the phenolic size coat was thermally cured. The make coat binder precursor of this abrasive composite did not receive a precure like that of Comparative Example A. The size coat binder precursor solution was applied next. The MA and the resole phenolic resin copolymerized when the composite received the final cure. A thermal drum cure was necessary to initiate the condensation co-polymerization at the site of the —OH and the —NHR functional group from the melamine and the phenolic resin and to cure the phenolic size coat. R was either hydrogen or substituted methylene group. The remaining steps were identical to those of Comparative Example A and the test results are set forth in Table I.

EXAMPLE 2

The coated abrasive of Example 2 was prepared and tested in the same manner as was the coated abrasive of Example 1 except that a different size coat binder was utilized.

The size coat binder precursor solution was identical to the make coat binder precursor solution, except that it contained 12.5% MA, 37.5% resole phenolic resin, 0.37% PH1, and 50% Wollastokup ® filler and was diluted with solvent to 78% solids. The size coat binder precursor solution was applied at a wet weight of 285 g/m² and the resulting composite was exposed to two ultraviolet lamps, each operating at 120 watts/cm. The ultraviolet light initiated the free-radical polymerization of the acrylates. The partially cured products were given a final thermal drum cure for two hours at 66° C., two hours at 88° C., and five hours at 138° C. The thermal drum cure was necessary to initiate the condensation copolymerization of the melamine acrylate (at the site of the —OH and the —NHR functional group) with the phenolic resin. However, this product did not undergo curing with a festoon oven. The test results are set forth in Table I.

TABLE I

| Example no. | Make coat binder | Size coat binder | Total cut (% of Comparative Example A) |
|---|---|---|---|
| A (Comp.) | phenolic | phenolic | 100 |
| 1 | MA/phenolic | phenolic | 157 |
| 2 | MA/phenolic | MA/phenolic | 180 |

The foregoing examples demonstrate the improvement that can be obtained in wet grinding utilizing a binder comprising melamine acrylate copolymerized with a resole phenolic resin. The addition of the melamine acrylate significantly improved the water resistance of the phenolic resin.

EXAMPLES 3 AND 4

Examples 3 and 4 compare the performance of a coated abrasive having a melamine acrylate binder having 2.1 pendant $\alpha,\beta$-unsaturated carbonyl groups per molecule with a coated abrasive having melamine acrylate binder having 2.5 pendant $\alpha,\beta$-unsaturated carbonyl groups per molecule.

EXAMPLE 3

A melamine acrylate resin containing 2.1 pendant $\alpha,\beta$-unsaturated carbonyl groups was prepared according to the procedure described in Preparation 1. A coated abrasive containing this resin in the make and size coat binders was prepared. The backing was YW2. The make coat binder precursor consisted of 47.5% of MA, 51.5% Wollastokup ® filler and 1% PH1. The make coat binder precursor was diluted to 93% solids with water. The make coat binder precursor solution was applied to the backing at an average weight of 240 g/m². Grade 50 alumina zirconia abrasive grains were applied over the uncured make coat precursor layer at a weight of 612 g/m². The resulting composite was exposed to one ultraviolet lamp operating at 120 watts/cm at 6.1 meters/minute. Next, a size coat binder precursor solution, which was identical to the make coat binder precursor solution, was applied at an average weight of 285 g/m². The resulting composite was exposed to two ultraviolet lamps operating at 120 watts/cm at 6.1 meters/minute. The product was thermally cured for 10 hours at 100° C. to effect condensation polymerization of the melamine acrylate. The coated abrasive was then flexed, converted into belts or segments and tested according to TP3 and TP4. The results are set forth in Table II.

EXAMPLE 4

A melamine acrylate resin containing on average 2.5 pendant acrylate $\alpha,\beta$-unsaturated carbonyl groups per molecule was prepared according to the following procedure. In a glass vessel were combined 900 g of spray dried methylolated melamine (BTLM 300, available from BTL Specialty Resins) and 1290 g of hydroxyethylacrylate (Dow Chemical). The resulting suspension was stirred and 4.4 g of trifluoroacetic acid were added. After stirring for 15 hours, the suspension clarified, becoming a colorless liquid resin (93% solids in water liberated in the etherification reaction). The melamine acrylate, designated MA5, was suitable for use in an abrasive article. The remaining steps for producing and testing the coated abrasive were the same as in Example 3, except that MA5 was used in place of MA.

TABLE II

| | Amount of stock removed | |
|---|---|---|
| Example no. | TP3 (g) | TP4 (g) |
| 3 | 1065 | 631 |
| 4 | 1142 | 487 |

TP3 is considered to be a low pressure grinding test, whereas TP4 is considered to be a high pressure grinding test. At low pressure grinding, there was no significantly large difference in performance between the coated abrasives of Examples 3 and 4. At higher pressure grinding, and under a water flood, the coated abrasive containing melamine resin having 2.1 pendant $\alpha,\beta$-unsaturated carbonyl groups per molecule cut 30% more than the coated abrasive containing melamine resin having 2.5 pendant α,β-unsaturated carbonyl groups per molecule.

COMPARATIVE EXAMPLE B AND EXAMPLE 5

These examples compare the performance of a coated abrasive segment having a resole phenolic resin as a make and size coat binder with a coated abrasive segment having an aminoplast having at least 1.1 pendant α,β-unsaturated carbonyl groups per molecule as the make and size coat binder.

COMPARATIVE EXAMPLE B

The coated abrasive for Comparative Example B was prepared in the same manner as was the coated abrasive of Comparative Example A; however, the coating weights for the make coat binder precursor solution, abrasive grain coat, and size coat binder precursor solution were as follows: 188 g/m², 650 g/m², and 350 g/m². Also, the make coat binder precursor was thermally cured for 40 minutes at 54° C., 40 minutes at 66° C., and 75 minutes at 88° C., and the size coat binder precursor was thermally cured for one hour at 54° C., 1.5 hours at 88° C., and 10 hours at 100° C. The coated abrasive was tested under TP4 and TP5. The test results are set forth in Table III.

PREPARATION 2

This preparation demonstrates a method for preparing the N,N'-oxydimethylenebisacrylamide ether from N-(hydroxymethyl)acrylamide. A flask was charged with 40.5 g of 37% aqueous formaldehyde, 142.2 g of acrylamide, and 50 g of 91% paraformaldehyde. The contents of the flask were stirred, and the pH adjusted to 8 using 50% aqueous sodium hydroxide. The flask was then warmed to effect solution. Next, an additional 142.2 g of acrylamide and 65.6 g of 91% paraformaldehyde were added to the flask. The reaction mixture was warmed to 45° C. and held at that temperature for about an hour, at which time the solution was complete. Next, 1 g of p-toluenesulfonic acid hydrate was added to the flask, and the temperature was maintained at 45° C. Within about 1½ hours, a thick white paste was formed consisting essentially of N-(hydroxymethyl)-acrylamide and N,N'-oxydimethylenebisacrylamide. This material was then designated BA.

EXAMPLE 5

The coated abrasive of Example 5 was identical to the coated abrasive of Example 3, with the exception that the MA resin in the make and size coat binders of the coated abrasive of Example 3 was replaced with the ether of N-(hydroxymethyl)-acrylamide resin of Preparation 2. The remaining steps for producing and testing the coated abrasive were the same as those for Example 3, except that the make coat binder precursor was first cured by being exposed to ultraviolet light at 3 meters/minute, with three consecutive passes under one Fusion UV Lamp, Model #F450. After coating, the size coat binder precursor was first heated for one hour at 66° C., then exposed to ultraviolet light at 3 meters/minute, with three consecutive passes under one Fusion UV Lamp, Model #F450, and then final cured for 10 hours at 100° C., and for 5 additional hours at 140° C.

TABLE III

| Example no. | Amount of stock removed | |
|---|---|---|
| | TP4 (g) | TP5 (g) |
| B (Comp.) | 509 | 405 |
| 5 | 1014 | 885 |

It can be seen from the data in Table III that there is a dramatic improvement when BA is used in the coated abrasive in place of the resole phenolic resin.

COMPARATIVE EXAMPLE C AND EXAMPLES 6 TO 9

Examples 6 to 9 demonstrate various embodiments of this invention. The test results are set forth in Table IV.

COMPARATIVE EXAMPLE C

The coated abrasive of Comparative Example C was the control example and utilized conventional resole phenolic make and size coat binders.

The make coat binder precursor contained 48% of resole phenolic resin, 52% Wollastokup ® filler. Ethyl cellosolve/water solvent was added to the make coat binder precursor formulation to produce an 81% solids solution. The make coat binder precursor solution was applied to 0.76 mm thick vulcanized fiber with an average weight of 172 g/m². Immediately thereafter, grade 100 aluminum oxide abrasive grains were applied over the make coat binder precursor at an average weight of 315 g/m². The substrate/make coat binder precursor/abrasive grain composite was precured for 90 minutes at 88° C. in a festoon oven. Next, a size coat binder precursor consisting of 32% resole phenolic resin, 66% cryolite, and 2% iron oxide filler was prepared and diluted to 72% solids with the aforementioned ethyl cellosolve/water solvent. The size coat binder precursor solution was applied at an average wet weight of 155 g/m². Then the resulting composite was precured for 90 minutes at 88° C. in a festoon oven and final cured for 10 hours at 100° C. The coated abrasive was flexed and tested under test procedure labeled TP6. The test results can be found in Table IV.

PREPARATION 3

Preparation 3 illustrates a method for preparing a melamine acrylate resin that has two pendant α,β-unsaturated carbonyl groups per molecule and no pendant —NHR or —OH functional groups.

A reaction vessel was charged with 234 g of a melamine resin ("Cymel 303", American Cyamamid), 138 g of hydroxy ethyl acrylate (Dow Chemical Co.), and 2.4 g of trifluoroacetic acid (Aldrich Chemical Co.). The reaction vessel was placed in a 60° C. water warming bath, and the contents were stirred until the loss of methanol was equal to 38.1 grams. The resulting resin (designated CA) was cooled to room temperature. This material can be represented by the following structure:

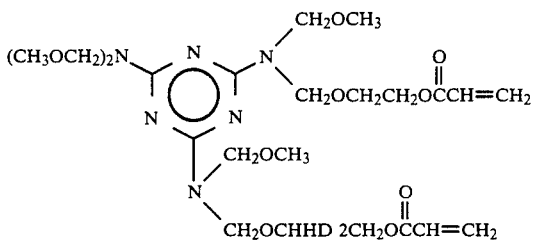

EXAMPLE 6

The coated abrasive of this example utilized a make coat binder precursor comprising an aminoplast having on average at least 1.1 pendant α,β-unsaturated carbonyl groups per molecule and an ethylenically unsaturated compound. A make coat binder precursor containing 43.2% CA, 4.8% NVP, 52% Wollastokup ® filler, and 0.48% PH1 was prepared. The make coat binder precursor was applied to 0.76 mm thick vulcanized fiber at an average weight of 172 g/m². Grade 100 aluminum oxide abrasive grains were applied over the make coat binder precursor at an average weight of 315 g/m². The resulting composite was exposed to two ultraviolet lamps operating at 120 watts/cm at 6.1 meters/minute. The remaining steps for producing and testing the coated abrasives were the same as those used in Comparative Example C.

EXAMPLE 7

The coated abrasive of this example was prepared and tested in the same manner as was the coated abrasive of Example 6, except that a different make coat binder was utilized. The make coat binder precursor comprised an aminoplast having on average at least 1.1 pendant α,β-unsaturated carbonyl groups per molecule and at least one pendant —NHR or —OH functional group per molecule and an ethylenically unsaturated compound. The make coat binder precursor consisted of 43.2% MA, 4.8% NVP, 0.48% PH1, and 52% Wollastokup ® filler and was diluted to 91% solids with a solvent comprising 50% ethyl cellosolve and 50% water.

EXAMPLE 8

The coated abrasive of this example was prepared and tested in the same manner as was the coated abrasive of Example 7 except that a different make coat binder was utilized. The make coat binder precursor comprised an aminoplast having on average at least 1.1 pendant α,β-unsaturated carbonyl groups per molecule. The make coat binder precursor consisted of 48% CA, 0.48% PH1, and 52% Wollastokup ® filler and was diluted to 91% solids with a solvent comprising 50% ethyl cellosolve and 50% water.

EXAMPLE 9

The coated abrasive of this example was prepared and tested in the same manner as was the coated abrasive of Example 6 except that a different make coat binder was utilized. The make coat binder precursor comprised an aminoplast having on average at least 1.1 pendant α,β-unsaturated carbonyl groups per molecule and a condensation curable resin. The make coat binder precursor consisted of 26.4% resole phenolic, 21.6% CA, 0.48% PH1, and 52% Wollastokup ® filler and was diluted to 88% solids with a solvent comprising 20% ethyl cellosolve and 80% water.

TABLE IV

| Example | Total cut (% of control) |
| --- | --- |
| C (control) | 100 |
| 6 | 113 |
| 7 | 133 |
| 8 | 117 |
| 9 | 144 |

The data in Table IV show that all of the coated abrasives utilizing binders of the present invention exceed coated abrasives utilizing resole phenolic resin binders in performance.

PREPARATION 4

This preparation demonstrates a method for preparing an acrylamidomethylated phenol. In a 500 ml beaker were placed 81 g of 37% aqueous formaldehyde, 71.1 g of acrylamide, and 50 mg of 4-methoxyphenol. The contents were stirred and warmed to 50° C. on a steam bath. The beaker was then transferred to a hot plate equipped with a stirrer. Next, 47 g of molten phenol were added to the beaker. The reaction mixture was stirred to produce a homogeneous solution, and then 2.4 g of methanesulfonic acid were added. The reaction mixture was heated to 55° C. and stirred at this temperature for 18 hours. After heating, the contents of the beaker were cooled to room temperature. The resulting reaction product was a clear, slightly viscous liquid, and was designated in the remaining example as AMP. The reaction product was subjected to a quantitative $^{13}$C NMR experiment and was found to consist essentially of a mixture of ortho and para acrylamidomethylated phenols.

EXAMPLE 10

The coated abrasive of this example was prepared in the same manner as was the coated abrasive of Example 2, except that the MA was replaced with AMP. The resulting coated abrasive was tested under test procedures labelled TP4 and TP5, and the test results are set forth in Table V. The coated abrasive of the control was made in the same manner as was the coated abrasive of Comparative Example A.

TABLE V

| | Amount of stock removed | |
| --- | --- | --- |
| Example no. | TP4 (% of control) | TP5 (% of control) |
| Control | 100 | 100 |
| 10 | 132 | 98 |

PREPARATION 5

This preparation demonstrates a method for preparing a glycoluril-acrylamide. In a 250 ml flask were placed 26.7 g (0.375 mole) acrylamide, 14.5 g (0.125 mole) hydroxy ethyl acrylate, 64 g of a glycoluril formaldehyde resin ("Cymel 1172", American Cyanamid), 0.4 g of trifluoroacetic acid, and 0.05 g of phenothiazine. The "Cymel 1172" resin is a 45% solution of tetramethylol glycoluril in water. This mixture was stirred and warmed in an oil bath to approximately 40° C. until nearly all the water had evaporated. The flask was weighed periodically to determine the amount of water remaining. The heating step took approximately 24 to 48 hours. The resulting liquid was found to have the desired acrylamidomethyl functionality and have

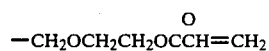

groups on the glycoluril backbone.

COMPARATIVE EXAMPLE D

The coated abrasive of Comparative Example D was the control example and utilized conventional resole phenolic make coat and size coat binders.

The make coat binder precursor contained 48% of a resole phenolic resin and 52% calcium carbonate filler. Solvent was added to the make coat binder precursor to produce an 88% solids solution. The make coat binder precursor solution was applied to 0.76 mm thick vulcanized fibre at an average weight of 390 g/m². Then, grade 24 aluminum oxide abrasive grains were applied over the make coat binder precursor at an average weight of 1321 g/m². The resulting composite was precured for 90 minutes at 88° C. in a festoon oven. Next, a size coat binder precursor consisting of 32% resole phenolic resin, 66% cryolite, and 2% iron oxide filler was prepared and diluted to 76% solids with solvent. The size coat binder precursor solution was applied at an average wet weight of 461 g/m². Then the resulting composite was precured for 90 minutes at 88° C. in a festoon oven and final cured for 10 hours at 100° C. The coated abrasive was tested under test procedure labeled TP7.

EXAMPLE 15

The coated abrasive of this example utilized a make coat binder precursor comprising an aminoplast having on average at least 1.1 pendant $\alpha,\beta$-unsaturated carbonyl groups per molecule and a condensation curable resin. The make coat binder precursor consisted of 52% calcium carbonate filler, 26.4% resole phenolic resin, 10.5% BA, 10.5% GUAM and 0.6% PH1. The precursor was diluted with solvent to produce an 88% solids solution. The make coat binder precursor solution was applied to 0.76 mm thick vulcanized fiber at an average weight of 390 g/m². Grade 24 aluminum oxide abrasive grains were applied over the make coat binder precursor at an average weight of 1320 g/m². The resulting composite was exposed to two ultraviolet lamps operating at 120 watts/cm at a rate of 6.1 meters/minute. The remaining steps for producing and testing the coated abrasive were the same as those used in Comparative Example D.

EXAMPLE 16

The coated abrasive for Example 16 was made and tested in the same manner as that used in Example 15, except that a different make coat binder precursor was employed. The make coat binder precursor consisted of 52% calcium carbonate filler, 26.4% resole phenolic resin, 21% BA, and 0.6% PH1.

TABLE VII

| Example | Coated abrasive disc loss (g) | Average cut (g) | % of control |
| --- | --- | --- | --- |
| Comparative D | 0.85 | 130.5 | 100 |
| 15 | 1.05 | 140 | 107 |
| 16 | 1.2 | 147 | 113 |

The performance of the coated abrasive containing the aminoplast with the pendant $\alpha,\beta$-unsaturated carbonyl groups in he make coat was slightly superior to that of the control example. However, the coated abrasive of Examples 15 and 16 did not require a thermal pre-cure for the make coat whereas the coated abrasive of Comparative Example D did.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprising abrasive grains, and at least one binder formed from a precursor comprising an aminoplast resin having an average at least 1.1 pendant $\alpha,\beta$-unsaturated carbonyl group per molecule, wherein said aminoplast resin is a glycoluril aldehyde.

2. A coated abrasive article comprising abrasive grains which are supported on and adherently bonded to at least one major surface of a backing sheet by a make coat of a first binder material and a size coat of a second binder material, at least one of said first binder material or said second binder material being formed from a precursor comprising an aminoplast resin having on average at least 1.1 pendant, $\alpha,\beta$-unsaturated carbonyl groups per molecule, wherein said aminoplast resin is a glycoluril aldehyde.

* * * * *

UNITED STATES PATENT AND TRADEMARK OFFICE
CERTIFICATE OF CORRECTION

PATENT NO. : 5,055,113

DATED : October 8, 1991

INVENTOR(S) : Larson et al.

Page 1 of 2

It is certified that error appears in the above-indentified patent and that said Letters Patent is hereby corrected as shown below:

Col. 10, line 58, first formula "$-OCH_2CHO\overset{\overset{O}{\|}}{C}CH=CH_2$"

should be $---OCH_2CH_2O\overset{\overset{O}{\|}}{C}CH=CH_2--$.

Col. 15, line 23, "f" should be --of--.

Col. 16, line 2, "INVENTION" should not be capitalized.

Col. 20, line 1, delete "b" between EXAMPLES and 3.

UNITED STATES PATENT AND TRADEMARK OFFICE
CERTIFICATE OF CORRECTION

PATENT NO. : 5,055,113
DATED : October 8, 1991
INVENTOR(S) : Larson et al

It is certified that error appears in the above-indentified patent and that said Letters Patent is hereby corrected as shown below:

Col. 23, line 10, "CH$_2$OCHHD 2CH$_2$O$\overset{\overset{O}{\|}}{C}$CH=CH$_2$" should be --CH$_2$OCH$_2$CH$_2$O$\overset{\overset{O}{\|}}{C}$CH=CH$_2$--.

Signed and Sealed this

Eighth Day of November, 1994

Attest:

BRUCE LEHMAN

Attesting Officer     Commissioner of Patents and Trademarks